US010445964B2

(12) United States Patent
Vallès Fontanals et al.

(10) Patent No.: US 10,445,964 B2
(45) Date of Patent: Oct. 15, 2019

(54) METHOD AND SYSTEM FOR THE SECURE AND VERIFIABLE CONSOLIDATION OF THE RESULTS OF ELECTION PROCESSES

(75) Inventors: Pere Vallès Fontanals, Barcelona (ES); Jordi Puiggalí Allepuz, Barcelona (ES); Victor Morales Rocha, Barcelona (ES)

(73) Assignee: Sctyl Secure Electronic Voting, SA, Barcelona (ES)

( * ) Notice: Subject to any disclaimer, the term of this patent is extended or adjusted under 35 U.S.C. 154(b) by 1112 days.

(21) Appl. No.: 12/837,912

(22) Filed: Jul. 16, 2010

(65) Prior Publication Data

US 2012/0016723 A1    Jan. 19, 2012

Related U.S. Application Data

(63) Continuation of application No. PCT/ES2007/000681, filed on Nov. 26, 2007.

(51) Int. Cl.
*G07C 13/00* (2006.01)
*H04L 9/08* (2006.01)
*G06Q 50/26* (2012.01)

(52) U.S. Cl.
CPC ............ *G07C 13/00* (2013.01); *G06Q 50/26* (2013.01); *H04L 9/0866* (2013.01); *G06Q 2230/00* (2013.01)

(58) Field of Classification Search
CPC ... G07C 13/00; H04L 9/0866; H04L 63/0861; G06Q 2230/00; G06Q 50/26

(Continued)

(56) References Cited

U.S. PATENT DOCUMENTS 5,189,288 A * 2/1993 Anno ..................... G06Q 50/34
                                                    235/386
5,583,329 A * 12/1996 Davis et al. ................ 235/50 A
(Continued)

FOREIGN PATENT DOCUMENTS

WO         0211025 A2     2/2002

OTHER PUBLICATIONS

Bruce Schneier, "Applied Cryptography", 1996, Jonh Wiley & Sons, Inc., Second Edition.*

(Continued)

*Primary Examiner* — Steven S Kim
(74) *Attorney, Agent, or Firm* — Robert J. Hess; Hess Patent Law Firm

(57) ABSTRACT

Secure and auditable consolidation of results of an electoral process, in which local electoral authorities participate to validate local electoral results by generating a validation proof, which is communicated to a consolidation module that verifies that the validation proof has been generated by the appropriate electoral authorities and then generates a receiving proof, which contains the result of the validation, which could be the acceptance or non-acceptance of the validation proof. The receiving proof is finally sent to the electoral authorities. There are different ways of generating the validation and receiving proofs so as to be able to robustly verify the identity of the local electoral authorities who have participated in the validation of the electoral results and to verify if the validated local electoral results are the same that are going to be consolidated and to preserve integrity of the official records of the local electoral results.

10 Claims, 3 Drawing Sheets

(58) Field of Classification Search
USPC .................................... 705/12, 67; 235/386
See application file for complete search history.

(56) References Cited

U.S. PATENT DOCUMENTS

| | | | | |
|---|---|---|---|---|
| 5,982,506 | A * | 11/1999 | Kara .............................. | 358/405 |
| 6,550,675 | B2 * | 4/2003 | Davis et al. ................... | 235/386 |
| 6,928,546 | B1 * | 8/2005 | Nanavati et al. ............. | 713/186 |
| 7,054,829 | B2 * | 5/2006 | Campo et al. ................. | 705/12 |
| 7,080,041 | B2 * | 7/2006 | Nagel ............................ | 705/51 |
| 7,099,471 | B2 * | 8/2006 | Neff .............................. | 380/30 |
| 7,234,060 | B1 * | 6/2007 | Amdur et al. ................ | 713/176 |
| 7,260,552 | B2 * | 8/2007 | Riera Jorba et al. .......... | 705/12 |
| 7,266,698 | B2 * | 9/2007 | Matsumoto ........... | G06F 21/645 |
| | | | | 705/67 |
| 7,284,700 | B1 * | 10/2007 | Morganstein ................. | 235/386 |
| 8,316,454 | B2 * | 11/2012 | Valls Fontanals ......................... | |
| | | | | G06F 21/6254 |
| | | | | 726/26 |
| 9,092,922 | B2 * | 7/2015 | Mugica .................. | G07C 13/00 |
| 2001/0018660 | A1 * | 8/2001 | Sehr ....................... | G06Q 10/02 |
| | | | | 705/5 |
| 2001/0035455 | A1 * | 11/2001 | Davis et al. ................... | 235/375 |
| 2002/0049906 | A1 * | 4/2002 | Maruyama .......... | G06Q 20/027 |
| | | | | 713/176 |
| 2002/0152379 | A1 * | 10/2002 | Gefwert et al. ............... | 713/168 |
| 2004/0117244 | A1 | 6/2004 | Scott | |
| 2004/0169077 | A1 | 9/2004 | Petersen et al. | |
| 2004/0225884 | A1 * | 11/2004 | Lorenzini ............ | G06F 21/645 |
| | | | | 713/176 |
| 2005/0218224 | A1 * | 10/2005 | Boldin .................... | G07C 13/00 |
| | | | | 235/386 |
| 2005/0247783 | A1 * | 11/2005 | Poulos et al. ................. | 235/386 |
| 2006/0005033 | A1 * | 1/2006 | Wood .................... | H04L 63/061 |
| | | | | 713/182 |
| 2006/0031116 | A1 * | 2/2006 | Bogasky et al. ............... | 705/12 |
| 2006/0157559 | A1 * | 7/2006 | Levy et al. ..................... | 235/380 |
| 2006/0200719 | A1 * | 9/2006 | Keller ............ | G01R 31/318547 |
| | | | | 714/732 |
| 2006/0202031 | A1 | 9/2006 | Chung et al. | |
| 2006/0266829 | A1 * | 11/2006 | Bolton .................... | G07C 13/00 |
| | | | | 235/386 |
| 2007/0040027 | A1 * | 2/2007 | Morales ......................... | 235/386 |
| 2007/0094510 | A1 * | 4/2007 | Ross ...................... | G06Q 20/02 |
| | | | | 713/178 |
| 2007/0170252 | A1 * | 7/2007 | Orton ............................. | 235/386 |
| 2007/0187498 | A1 * | 8/2007 | Haas ....................... | G07C 13/00 |
| | | | | 235/386 |
| 2007/0241190 | A1 * | 10/2007 | Hotto et al. ................... | 235/386 |
| 2008/0215890 | A1 * | 9/2008 | Buer .............................. | 713/186 |

OTHER PUBLICATIONS

Bruce Schneier, "Applied Cryptography", John Wiley & Sons, Inc., 1996.*

Bruce Schneier, "Applied Cryptography", Copyright 1996, John Wiley & Sons, Inc., Second Edition.*

* cited by examiner

METHOD AND SYSTEM FOR THE SECURE AND VERIFIABLE CONSOLIDATION OF THE RESULTS OF ELECTION PROCESSES

FIELD OF THE INVENTION

The present invention primarily relates to the field of electoral processes and introduces a secure and auditable method for the results consolidation. The method provides the necessary processes for local electoral authorities, such as the members of a polling station, to communicate electoral results to a results consolidation center in a secure and auditable manner.

The method can be used in results consolidation in remote settings in presential or remote electoral processes.

The invention also relates to a system for implementing the mentioned method.

BACKGROUND OF THE INVENTION

Accuracy in the results is an essential characteristic of any electoral process. The vote recount has traditionally been carried out manually, which results in an unwanted delay in publishing the results, and especially a high probability of committing errors in said recount.

The modernization of electoral systems has enabled speeding up the vote recount and the accuracy in the results by means of using electronic voting devices (e.g. electronic voting terminals or vote scanning machines). These devices enable generating an electronic record of the votes, and therefore performing a faster and more reliable electronic recount. They also make it easier to send both the electronic votes and the local results obtained to a central recount system which allows consolidating the results of different electoral colleges or voting channels. However, the current proposals only contemplate protecting the privacy of the votes or results sent by means of encryption. These solutions do not incorporate measures making it easy to audit the integrity of said local recounts or to identify if these results have been endorsed by the authorities responsible for performing said recount. It is therefore impossible to reliably verify if the local recounts received by the consolidation center have been manipulated before being processed by the consolidation center. Additionally these proposals do not take into account the possibility of consolidating results coming from manual recounts, so they cannot be applied to traditional voting settings.

An example of these proposals can be found in patent document U.S. Pat. No. 7,044,375, describing a system in which a consolidation central of the results of a vote is performed, carried out by electronic means. The system has an acquisition and communication device that is responsible for collecting the votes and/or results generated in the local voting and/or recount machines in the voting premises. This data is encrypted and sent from each local premises to a central results consolidation system by means of a communication channel. The central consolidation system receives the data, decrypts and performs the recount. The consolidation system periodically sends the updated results to a results publication system. As mentioned above, this solution does not incorporate measures which allow protecting the integrity of the data sent to the system central. Nor does it incorporate measures which allow verifying if the sent data has been verified by the local electoral process authorities, rather it assumes at all times that the received data is from a reliable source, without validating such source.

Similarly, patent document US20060196939 describes an electronic voting system including a centralized vote recount system. The local results of each electoral premise is encrypted and sent to a centralized recount system. Said transmission can be online or by means of physically transporting the local recount terminal storage devices. The local storage device has a physical interface allowing it to connect to the centralized recount system in order to download and decrypt the local results. The centralized recount system sends the results to a publication system through a communication network, which publication systems is responsible for disclosing the results.

Neither of the two aforementioned cases proposes actions that help to preserve the integrity of the results. Although in both cases the local results are encrypted before being sent to the central server, which protects them during transmission, they do not consider techniques that assure the integrity of the local results before being sent, nor can they assure the integrity of the end result.

Due to the possibility of manipulation of the results, there are methods which seek to verify (or audit) the accuracy in the result of an election by means of parallel records in different storage mediums. One example thereof are systems which print each vote while at the same time recording such vote in an electronic medium.

The main drawback with parallel vote recording systems is that if one of the records is manipulated, it can only be detected by means of an audit. In the event that a discrepancy is detected in the recount of both records, it is impossible to know which of them has been manipulated, and it is therefore impossible to be certain of which is the correct result.

The present invention describes a method for consolidating results of an electoral process in a secure manner. Said method allows consolidating the local results generated in different local premises or even in different electronic voting channels or platforms. Another object of the present invention is to protect the integrity of the local election results, as well as to check the authorship of the election official or officials sending said local results. The present invention further seeks to generate physical records of the local results and to protect their integrity, as well as to check the authorship thereof.

BRIEF DESCRIPTION OF THE INVENTION

The present invention describes a method for the consolidation of electoral process results which enables electoral authorities to protect the security and auditability of local results of the electoral unit to which these authorities have been assigned. The present invention describes as part of the method, the generation by one or more members of the local electoral authorities of a validation proof of the electoral results, which allows at least identifying the members of the electoral authority who have participated in the validation of the local electoral results. The method also describes generating a validation proof which is further linked to the validated local electoral results by the members of the local electoral authority who have participated in this validation process. This validation proof will be used to verify if local electoral results to be consolidated have previously been validated by the assigned local electoral authorities. The method also provides communicating to the electoral authorities of the result of said verification.

In a basic embodiment, the method comprises the following steps:

a) The local electoral authorities validating the information of the local electoral result by means of generating a validation proof which allows verifying the participation of at least one part of said local electoral authorities in said validation;

b) Communicating said validation proof to a consolidation module;

c) Verifying in said consolidation module that the communicated validation proof of the local results has been generated by the appropriate local authorities;

d) Generating in the results consolidation module a reception proof for receiving at least said validation proof and representing at least the result of the verification; and e) Communicating to the local electoral authorities the acceptance or non-acceptance of the local results based on the reception proof.

The method optionally provides that steps a) and b) are carried out by means of an information transfer module.

In relation to the step of generating the validation proof, the invention introduces different alternatives for generating said proof such that the proof allows identifying the identity of the authorities who have participated in the validation of the local results. It also provides different alternatives by means of using cryptographic and/or biometric techniques for generating the validation proof such that it further allows linking said proof to the validated local electoral results.

In relation to the verification step, the invention describes different alternatives of verifying the validation proof and supported actions based on the result of said validation, such as proceeding to the acceptance or non-acceptance of the local results for their consolidation.

The invention also describes different alternatives for generating a reception proof, including that of including an integrity proof generated from the accepted local electoral results, such as a digital signature.

The invention finally describes how the information of the reception proof can optionally be used to protect the official electoral record of the local electoral results. It also describes how the privacy of the validation signature digital and/or the communicated electoral results could be protected by means of using cryptographic techniques.

Figure 1:
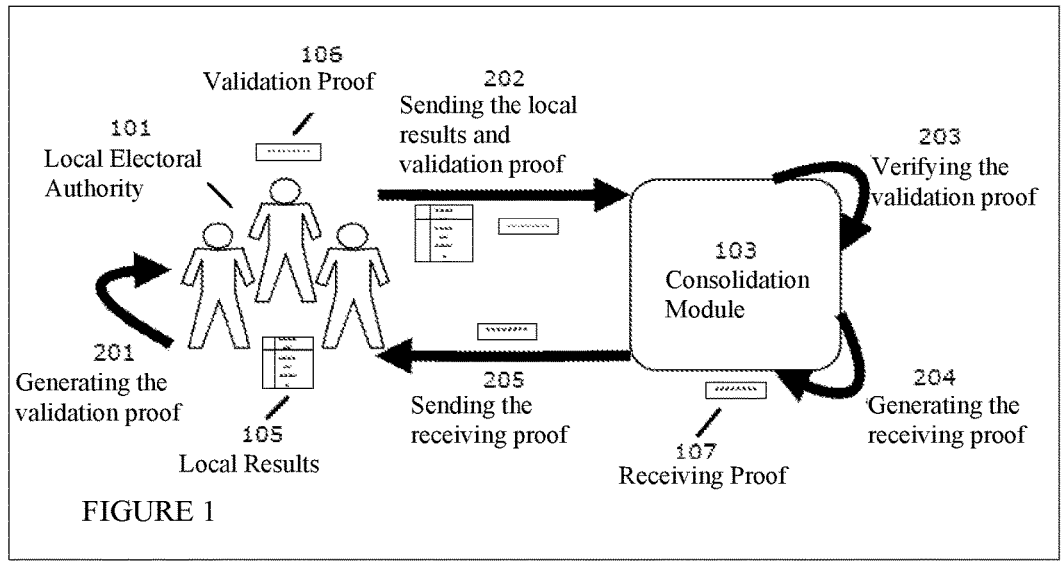
FIG. 1 shows an embodiment example with the main components and processes of the present invention. It shows how local electoral authorities 101 validate local results information 105 communicated to a consolidation module 103 by means of the following steps.

Generating 201 a validation proof 106 based on the local results information 105.

Communicating 202 the local results 105 and the validation proof 106 to the consolidation module 103.

Verifying 203 the validation proof 106 by consolidation module 103.

Generating 204 the reception proof based on the result of the verification process.

Sending 205 the reception proof 107 to the local electoral authorities 105.

Figure 2:
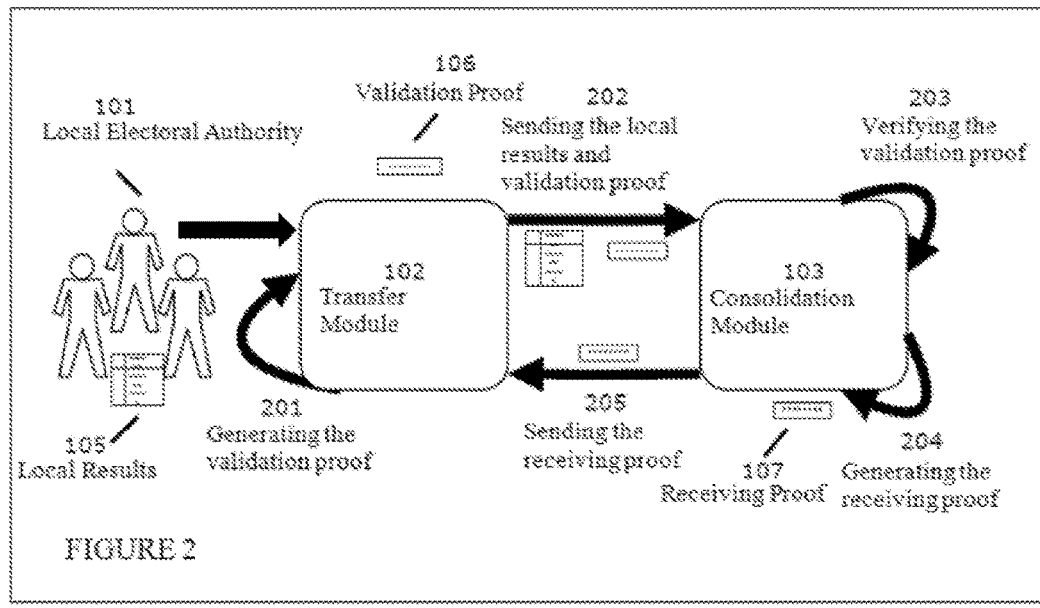

FIG. 2 shows an alternative embodiment of the method described in the present invention. In said embodiment, an additional transfer module 102 is used for generating 201 the validation proof 106 and for sending 202 the local results 105 and the validation proof 106 to the consolidation module 103.

Figure 3:
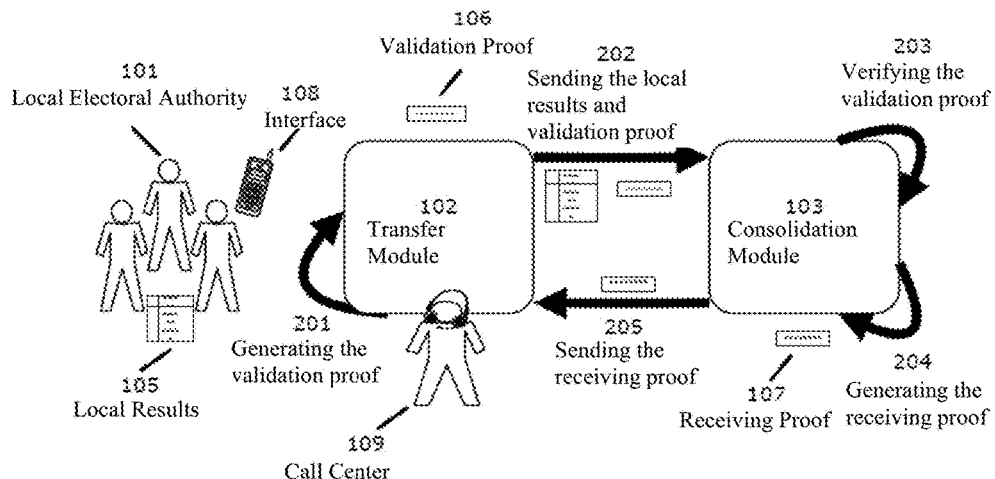
Figure 3:
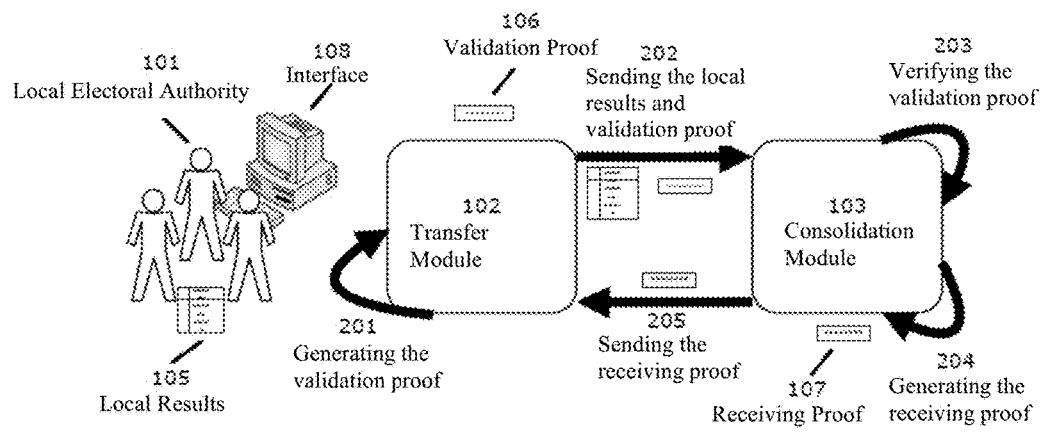

FIG. 3 shows two examples of applying the present invention. In the example of FIG. 3-a, a telephone line 108 is used as a transmission means to communicate the local results information 105. The transfer module 102 has a call center 109 to receive the transmitted information. The example of FIG. 3-b uses a computer as the interface 108 to enter the local results information 105.

Figure 4:
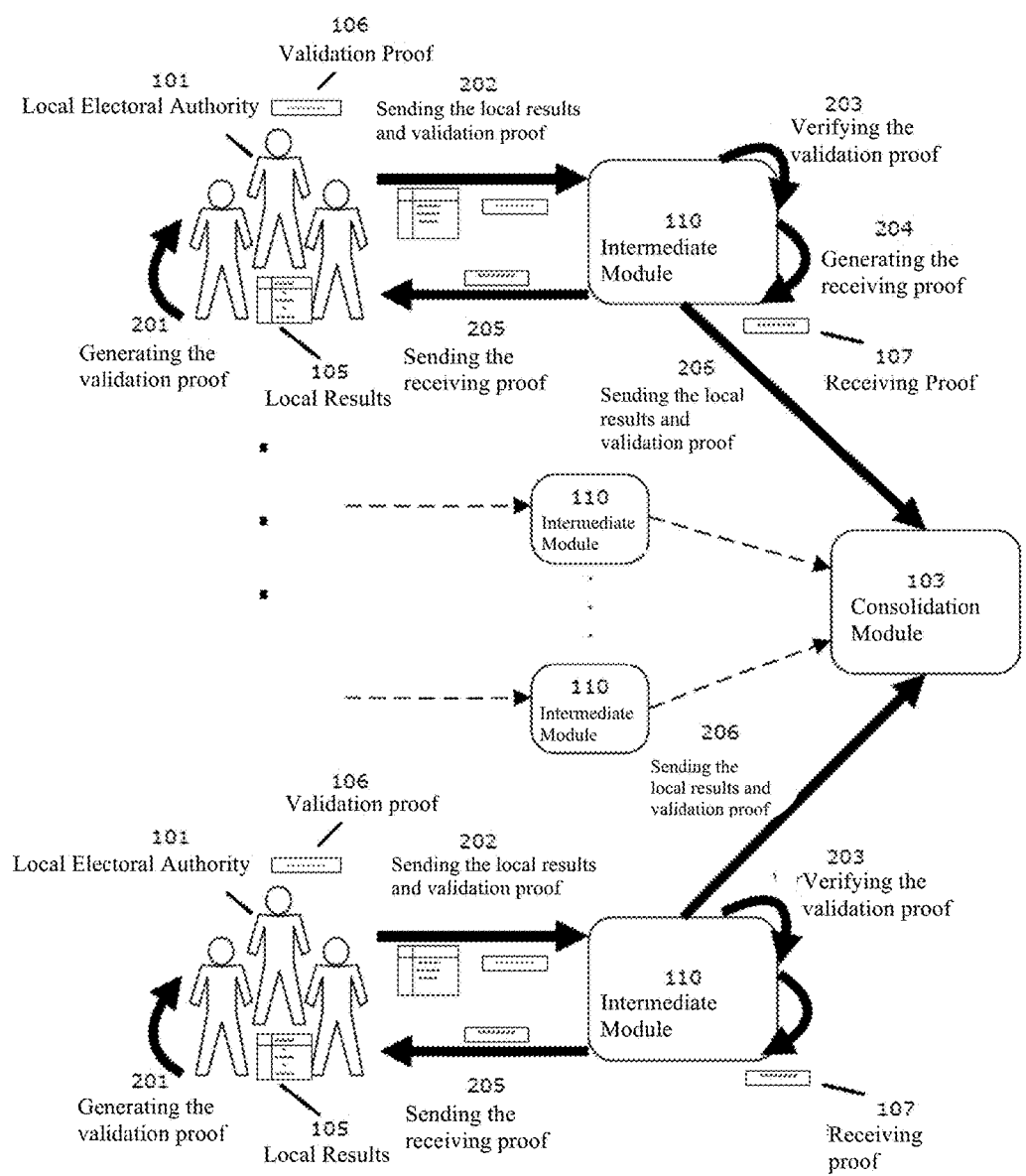

FIG. 4 shows another alternative embodiment of the present invention, in which there are intermediate consolidation modules 110. It shows a set of local electoral authorities 101 in which each set represents the electoral authorities responsible for an electoral management unit. The figure shows how different local electoral authorities 101 carry out the sending 202 of the local results information 105 and validation proofs 106 to different intermediate consolidation modules 110. Said intermediate consolidation modules 110 in turn send the local results information 105 to the main consolidation module 103 once said local results information 105 has been validated and accepted.

DETAILED DESCRIPTION OF THE INVENTION

The present invention relates to a method making the secure results consolidation of an electoral process easy, which can be applied both to presential and remote voting settings. The results consolidation is carried out by means of using techniques and processes which allow protecting the integrity and audit of the electoral results.

In this invention electoral process will be understood as any public or private consultation or request for information and a limited or open set of people, based on which a global or partial accumulative or qualitative results will subsequently be carried out. Examples of electoral processes, without the intention of limiting their definition to them, are votes, consultations, surveys, examinations or evaluation tests.

In order to put the present invention into practice, the existence of local electoral authorities belonging to an electoral college or to any other electoral management unit (e.g. district, premises, municipality, etc.) is considered. These electoral authorities could be formed by an electoral committee (e.g. a polling station), one or more local electoral administrators, or a combination of them. The main function of these local electoral authorities is to validate, at least part of them, the local results of their electoral management unit. These local electoral authorities or part of them could optionally also have participated in obtaining the local recount and/or communicating said results. These local electoral authorities or part of them could also be responsible for generating and/or validating (e.g. by means of a signed manuscript) an official record on paper of the local electoral results of their electoral management unit. This record is commonly attached to the physical or electronic votes that have been used for the local recount and sent to the central electoral authorities for their central recount or audit.

Additionally, for the embodiment of this invention the existence of a consolidation module is provided in which the validated local results are normally communicated. This module verifies that said communicated local results have been validated by the corresponding local electoral authorities, and communicates the result of that verification to said authorities. To that end, it is provided that this consolidation module has data input and output means and processing means to receive and verify information related to local results. Information related to the result of the verification is communicated to at least the local electoral authorities. Optionally, depending on the result of the verification, this module can store the results for their consolidation; therefore it could have storage means. To make the remote communication of the local results and of the result of the verification easier, this module could be connected to a communications network and receive the local results and/or the information for the verification by means of this communications network. Therefore at least part of said data input and output means could be an analog or digital communication interface.

Optionally, in order to make the remote communication of the local results and/or generating validation information easier, the existence of an information transfer module is also provided, through which module the local results will be communicated to a consolidation module. For this purpose it is provided that said module has a data input and output interface which allows entering said results and communicating them to the consolidation module. Other additional validation information which may be required by the consolidation module in order to verify if said local results have previously been validated by the relevant local electoral authority can also be communicated along with the local results. This validation information can be generated in said module based on information obtained from at least part of the local electoral authorities. To that end, said module will have processing means in addition to the data input and output interface.

In a preferred embodiment, the invention will begin by means of a first validation phase by local electoral authorities of information of a local electoral result. For the sake of simplicity, it is assumed that the local results can only be validated by the local electoral authorities assigned during the set up of the election, although other entities (e.g. observers) could participate in this process if the electoral process allows it. This validation will consist of generating a validation proof for testing the local electoral result information containing information which allows verifying the identity of the authorities who have participated in said validation process. To that end this validation proof must contain at least identity information of at least part of the authorities who have participated in generating the validation proof. This identity information could be generated from identification credentials, such as a password, a biometric record or any other identity proof that may allow uniquely identifying the electoral authorities. The set or combination of these identity proofs would form the validation proof (VT).

$VT = (Id_1, Id_2 \ldots Id)$ $Id_i$ identity proof of the authorship $i$

Said identity information could also optionally be generated by means of mechanisms which allow linking said identity proof to the local results information. In addition to identifying the authorities who have participated in the validation, the validation proof would thus also protect the integrity of the local results information (i.e., any subsequent modification of the validated local results information would invalidate the validity proof).

In a preferred embodiment, this identity information will be generated using cryptographic algorithms, such as a digital signature or a MAC, applied to at least the local result information using at least one password. The password or passwords used for implementing this signature or MAC would be in the possession of one or several members of the local electoral authorities participating in generating the validation proof. In this sense, a single password could be in the possession of a single member (e.g. an election administrator) or held by at least one subset of the electoral authorities, by means of using a secret sharing scheme or an equivalent method. In a preferred embodiment based on the existence of a single password, this password will be used to generate a signature or MAC on the local result information (LRI) or on the chaining of said electoral result information with identity proofs of the authorities who also participate in the validation process, and who do not have access to the password. As previously mentioned, the identity proofs could by any credential uniquely identifying a member of the electoral authority. Finally, the validation proof would be formed by at least said digital signature or MAC obtained, or the chaining of this signature or MAC with the identity proofs used to generate them. For example:

$VT = S(LRI)$ $VT = S(LRI|(Id_1, Id_2 \ldots Id_n))$ $VT = S(LRI|(Id_1, Id_2 \ldots Id_a))|(Id_1, Id_2 \ldots Id_n)$ $VT = S(LRI)|(Id_1, Id_2 \ldots Id_n)$ In another alternative embodiment, more than one cryptographic password could be used to generate the identity information. In this case the digital signatures or MAC could be generated in a nested manner (e.g. make a digital signature from another prior digital signature) or they could be chained or combined with one another. In either of the cases, one or several of these signatures will be made from of at least the local electoral result information. As in the previous embodiment based on a single password, in addition to the local result information, it also provides using in any of the signatures the identity proofs of the authorities participating in the validation of the local result information. In either of the cases, the validation proof would contain at least the identity information and optionally the identity proofs of the authorities who have participated in the validation.

Finally, as an alternative to the use of cryptographic algorithms, the invention also provides generating the identity information based on one or more biometric records of the electoral authorities participating in the validation. These records must contain at least information related to the local results information. This related information could be all of, part of or one integrity proof of the local results. The integrity proof of the results could be obtained by means of the application of a cryptographic hash function (e.g. MD5, SHA1 or other equivalents) or a compression function (e.g. GZIP, RAR or equivalents) on the local electoral result information. An example of biometric proof related to the local results information, without limiting the method to its use alone, could be a voice record of one or several local electoral authorities mentioning part of the hash value of the local electoral result information. In this sense, the validation proof would contain an identity information formed from a set of one or more biometric records of electoral authorities containing the local result information. The biometric records could optionally have been previously encrypted by a symmetric or asymmetric password to preserve the privacy of their contents (e.g. a password or a finger print). The data would thus not be publicly accessible and only the owner of the decrypting password could access this data (e.g. central electoral authorities).

Once the validation proof is generated, the method provides a second communication step for communicating to a consolidation module of at least said validation proof. Optionally, in the event that the consolidation module does not have the local results, such results could be communicated together with the local recount information. Both the local results and the validation proof could also optionally be completely or partially encrypted (e.g. only the parts that are considered important to be kept secret, such as the credentials or biometric records) before being communicated. This encryption will allow assuring the privacy of the local results and/or of the validation proof in the cases in which it is required. The encryption could be carried out indistinctly by means of a symmetric or asymmetric system, provided that the decrypting password is in the position of the authorship responsible the consolidation module.

In a third step of the method, the results consolidation module will verify if the communicated validation proof has been generated by the appropriate local electoral authorities. To that end it will verify if among the credentials, biometric tests, digital signatures and/or any identity proof contained in the validation proof, the identities of the local authorities responsible for performing that validation are included. In this sense the validation proof may contain, apart from the identities required for this verification process, the identities of other electoral authorities that may be used in other subsequent results audit processes. In a basic embodiment, the validation process would take into account all the identities contained in the validation proof. In an alternative embodiment, the verification process would only verify some of the identities contained in the validation proof. For example, the identification proof could be formed by the digital signature (e.g. generated by an electoral administrator) of the identity proofs of the members of the polling station, the latter being able to be encrypted. In this case, the validation could be performed only on the identity of the electoral authority that has performed the signature and the rest of the identity proofs would not be taken into account. Therefore, if the latter were encrypted, it would not be necessary to decrypt them. This type of verification is useful in the case that the validation proof is to be used in subsequent verification or audit processes. For example, the validation of the remaining identity proofs could be performed in a second consolidation module which is in a more secure environment.

In the event that the validation proof has been generated by means of mechanisms which allow linking said identity proof to the local results information (described above) during this verification step the correspondence of the validation proof with the local results could also be verified. If the mechanism is a digital signature or a MAC, it would then be verified that this MAC or digital signature corresponds to the communicated local result information. If the mechanism used is based on biometric techniques, it will be verified that the biometric record contains the local result information, part of it or an integrity proof of such information (depending on the process used in the validation step to generate the validation proof).

Once the validation proof is verified, the invention will proceed to a fourth generation step for generating a reception proof, which will contain at least the result of the verification. This result of the verification contained in the reception proof can be a numerical value, alphanumerical value, a text or the combination thereof. For example, a 1 could be used to represent that the verification has been correct or a 0 in the event that it is incorrect. A value or text can also be established for one of the cases (e.g. 1) and the other one can be left open to any other value different from the previous one (e.g. any text or value different from 1). In an alternative embodiment, in the event that the verification is positive, the reception proof could contain an acceptance proof generated from at least part of the local result information of the verified validation proof. This acceptance proof could be a digital signature or MAC applied on at least part of the local result information or a unique identifier of these local results. Therefore, based on the acceptance proof contained in the reception proof, it could be verified if the verified local electoral results from the previous step correspond with those validated by the local electoral authorities.

Alternatively, the acceptance proof could contain a subset of information of this signature, a summary (e.g. cryptographic) of the signature or a subset of the information of the hash of this signature. The objective would be to generate an acceptance proof that had a size that can be used for a visual or audible representation of this acceptance proof.

In the event that the verification is positive, the consolidation module could store the local result information if necessary. In this same case and also optionally, the consolidation module could also store the validation proof together with the result information or independently. Both the election result information and the validation proof could be stored in the same module that performed the verification or in an additional consolidation module.

Finally, in its basic embodiment, the method provides a last communication step for communicating the reception proof to at least the local electoral authorities that generated the validation proof. These authorities are thus informed of whether or not the validation proof and the local electoral results have been accepted.

Optionally, in the event that the reception proof contains an acceptance proof, said acceptance proof could be used to verify that the verified local electoral results are the same as those previously validated. For example, it could be verified if the signature contained in the acceptance proof corresponds with the local electoral results validated by the local electoral authorities. This acceptance proof could also optionally be included in the official records of the electoral results generated by the local authorities. For example, the acceptance proof could be printed or written in the official records of the presential results of an electoral college or precinct. It could thus be verified if the results contained in the record have been communicated and accepted by the consolidation module, verifying the existence of the acceptance proof in the record. If the acceptance proof was further generated from a digital signature of the local result information, the integrity of the record could also be verified, checking that the results reported therein correspond with that of the signature contained in the acceptance proof.

At this point of the invention, the results consolidation (or global election recount) based on the set of local electoral results accepted by the consolidation module could be carried out. These local electoral results could have been stored by the same consolidation module as described above or could have been stored by means of other processes independent from the steps mentioned in the invention. In the case in which the local result information is partially or completely encrypted by the local electoral authorities, an additional decrypting step to decrypt said information will be performed before consolidating the results. This decrypting process could be performed in a consolidation module. The decrypting would be performed using the private password in the possession of a single member of the central electoral authority. Alternatively, the private password could be held by a group of members of the central electoral authorities. This would be possible by means of a secret sharing scheme, in which each electoral authority possesses part of the private password. To carry out the decrypting, all or a predetermined subset of the electoral authorities must collaborate to reconstruct the password and then carry out the decrypting.

Additionally, before consolidating the results, a second validation step to validate the identities of the validation proof that had not previously been verified could be performed. If the identity proofs are encrypted, they will be decrypted using a process similar to the decrypting of the local result information described above. In the event that these identities do not correspond with those assigned during the election set up process, the local results information related to the rejected validation proofs could be isolated. This local result information would therefore not be reused in the final consolidation. For example, based on the previous example in which the validation proof contained the encrypted identity proofs of the members of the polling station signed by an electoral authority, the validation of the identities of the members of the polling station would be performed in this step.

To end the process, the consolidation module could also perform the final results recount process.

In a practical embodiment of this method, the consolidation module could be completely isolated, i.e. with no network connection. In this case, the communication of the local results and/or validation proof could be carried out through removable storage means. The local results validated by the local electoral authorities, along with the validation proofs, would have been previously stored in said storage means. The removable storage means will be connected in the consolidation module so that the information contained can be read and subsequently processed.

In another practical embodiment of the present invention, it could have one or more intermediate consolidation modules. Each of these intermediate modules will receive the local results from previously assigned electoral management units. Each intermediate consolidation module will carry out the already described verification processes to verify the validation proof, will generate the reception proof and send same. Once the intermediate consolidation modules have received and validated the information from all the assigned electoral management units, at least the local results information will be resent to the main consolidation module. Alternatively, each intermediate consolidation module will perform a recount of the local results received, in which case this partial recount could be sent to the main consolidation module.

In another practical alternative embodiment of the present invention, the results generated from two or more different voting channels can be consolidated simultaneously. Such channels can include, for example, those already mentioned presential electronic voting systems, systems of voting by Internet, voting by means of mobile telephony, voting by telephone (IVR), voting by mail and any other known voting system. In this embodiment, the vote reception and counting center for each voting channel would act as an electoral management unit, represented by electoral authorities. Therefore, the processes carried out for the consolidation of the results would be identical to those already described in the preferred embodiment.

LEGENDS OF THE DRAWINGS

FIG. 1
101=Local Electoral Authority
103=Consolidation Module
105=Local Results
106=Validation proof
107=Reception proof
201=Generating the validation proof
202=Sending the local results and validation proof
203=Verifying the validation proof
204=Generating the reception proof
205=Sending the reception proof
FIG. 2
101=Local Electoral Authority
102=Transfer Module
103=Consolidation Module
105=Local Results
106=Validation proof
107=Reception proof
201=Generating the validation proof
202=Sending the local results and validation proof
203=Verifying the validation proof
204=Generating the reception proof
205=Sending the reception proof
FIG. 3A
101=Local Electoral Authority
102=Transfer Module
103=Consolidation Module
105=Local Results
106=Validation proof
107=Reception proof
108=Interface
109=Call Center
201=Generating the validation proof
202=Sending the local results and validation proof
203=Verifying the validation proof
204=Generating the reception proof
205=Sending the reception proof
FIG. 3B
101=Local Electoral Authority
102=Transfer Module
103=Consolidation Module
105=Local Results
106=Validation proof
107=Reception proof
108=Interface
201=Generating the validation proof
202=Sending the local results and validation proof
203=Verifying the validation proof
204=Generating the reception proof
205=Sending the reception proof
FIG. 4
101=Local Electoral Authority
103=Consolidation Module
105=Local Results
106=Validation proof
107=Reception proof
110=Intermediate Module
201=Generating the validation proof
202=Sending the local results and validation proof
203=Verifying the validation proof
204=Generating the reception proof
205=Sending the reception proof
206=Sending the local results and validation proof

What is claimed is:

1. A method for the protection of secure and auditable results consolidation of an electoral process based on a periodic transmission of electoral local results obtained from an official local results record related to different voting channels, in which at least local electoral authorities formed by at least one member participate, said method comprising for each transmission of local results the following steps:

a) receiving, by an information transfer module, via an input interface, from the local electoral authorities, information of said local results and identification credentials of the local authorities, said information transfer module being a device with computational capacity including a personal computer, a Personal Digital Assistant (PDA) or a mobile telephone connected to a communication network and said credentials including at least a password or a biometric record;

b1) generating, by the information transfer module, an identity proof of at least one part of the local electoral authorities, said identity proof being generated from said identification credentials of the local electoral;

b2) validating, by the information transfer module, the received information of the local results by generating a validation proof of said local results, wherein the generating of the validation proof comprises performing cryptographic digital signature technique on said identity proof and said information of said local results or a cryptographic message authentication code (MAC) technique on said identity proof and said information of said local results, wherein both of the cryptographic techniques use at least one said password or said biometric record as a key in said cryptographic techniques;

b3) partially or completely encrypting, by the information transfer module, the validation proof, the identity proof, and the received information of the local results using a symmetric or asymmetric encryption system;

c) communicating, by the information transfer module, via an output interface, the received information of the local results, the identity proof, and said generated validation proof to a consolidation module, wherein at least one of the validation proof, the identity proof, and the received information of the local results being partially or completely encrypted, and wherein the consolidation module being a personal computer or a server connected to a communication network;

d) carrying out, by the consolidation module, a verification process including verifying if the communicated validation proof has been generated by appropriate local electoral authorities, wherein said verification process including checking whether the at least one identity proof contained in the validation proof correspond to an identity of the local electoral authorities responsible for performing the validation process of the local results;

e) generating, by the consolidation module, a receiving proof representing at least a result of the verification process carried out in step d), said receiving proof containing an acceptance proof generated from at least local results information of the validation proof after being verified in step d);

f) communicating, by the consolidation module, through the information transfer module, the generated receiving proof to the local electoral authorities; and g) including, by the information transfer module, the acceptance proof in a written or printed manner in an official local results record generated by the local electoral authorities.

2. The method according to claim 1, further comprising: linking the one identity proof to the local results information.

3. The method according to claim 2, wherein the verification process of the validation proof of step d) further includes checking, by the consolidation module, whether the validation proof corresponds with the local electoral results.

4. The method according to claim 3, wherein the checking consists of verifying if the at least one identity proof contained in the validation proof is linked to the local electoral results.

5. The method according to claim 1, wherein the receiving proof of the local results of step e) contains at least a result of the verification as a numerical representation, alphanumerical representation, a text or the combination thereof.

6. The method according to claim 5, wherein said receiving proof further contains at least part or a summary of a digital signature or a MAC function applied on at least the information of said local results validated by the validation proof.

7. The method according to claim 6, wherein the local electoral authorities use the contents of said receiving proof to verify if the local results verified by the consolidation module are the same local results validated in the step b2).

8. The method according to claim 1, wherein the information of the local electoral results and/or said generated validation proof of the local results communicated in step c) are stored in the consolidation module.

9. The method according to claim 1, further comprising in the consolidation module, carrying out an additional decrypting step for decrypting the local electoral results and/or validation proof received in step c) with means for decrypting.

10. The method according to claim 9, wherein the means used for decrypting the electoral results is distributed among a set of electoral authorities using a secret sharing scheme.

* * * * *